Figure 1:
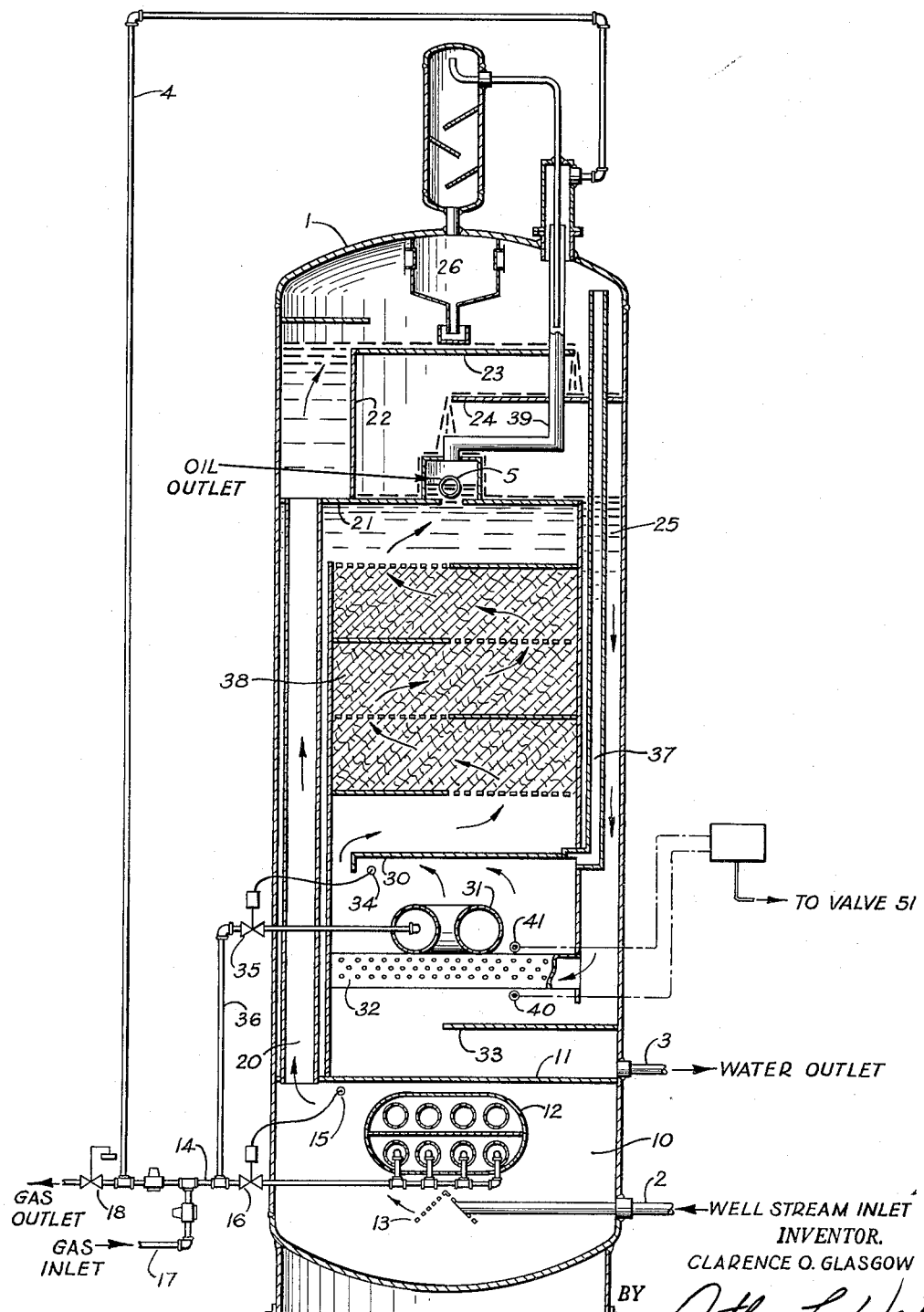

INVENTOR.
CLARENCE O. GLASGOW
BY Arthur L Wade
ATTORNEY

United States Patent Office 2,995,202
Patented Aug. 8, 1961

2,995,202
EMULSION TREATERS AND EMULSION TREATING METHODS
Clarence O. Glasgow, Tulsa, Okla., assignor to National Tank Company, Tulsa, Okla., a corporation of Nevada
Filed Apr. 22, 1959, Ser. No. 808,050
7 Claims. (Cl. 183—2.7)

The present invention relates to emulsion treaters and emulsion treating methods. The invention is particularly concerned with processing oil well production in the field in order to separate the production into oil, water and gas.

Oil well production varies widely in quality, between localities. The treatment, or separation into oil, water and gas, of black asphaltic base crude oil production offers a particular problem. The oil of this production has a low gravity, in the order of 25 or 30 API to 9 or 10 API, and a high viscosity. When heat is applied to this production to treat it, a great deal of foam develops. The situation is further complicated by the union between the water and oil, as an emulsion, being relatively strong, or "tight."

When there is a great deal of water produced along with this low-gravity, high viscosity, oil, a more specific problem is created. Chemicals, in the proper proportion and quantity, are helpful in the treatment process. However, the basic force for breaking the union between oil and water is heat. The water content of the production may be utilized to reduce the foaming tendency of the oil. However, the large quantities of heat absorbed by the water represent a loss if not recovered.

A primary object of the present invention is to treat oil well production having a large percentage of water and an oil which is low in gravity and high in viscosity and which has a tendency to foam when treating heat is applied to it.

Another object of the invention is to utilize the high percentage of water of an oil well production to reduce the foam which is formed when the production is heated to a temperature which will degas the production and break the oil-water emulsion.

Another object of the invention is to apply heat to an oil well production in a first stage in order to break the emulsion and reduce the resulting foam, followed by a degassing of the production with mechanical action, followed by heating the oil and emulsion of the production in a second stage of heating to replace the heat lost when the foam was broken with mechanical action, followed by removing gas evolved in the second stage heating and coalescing oil and water of the production.

Another object of the invention is to treat an oil well production having a high percentage of water by first heating the entire well stream to a temperature at which the emulsion of the production will break and then mechanically scrubbing the emulsion with the water to break the foam of the oil and then removing the water into a heat transfer process whereby the heat in the water is used to raise the temperature of the production fluid to the first heating process.

The present invention contemplates treating low-gravity, high-viscosity, foamy oil well production having a high water content by first heating the entire well stream high enough to break the oil-water emulsion and then scrubbing the resulting foam with the heated water of the production.

The invention further contemplates that the entire well stream raised to the treating temperature and having its foam broken by scrubbing with the heated water of the production will be passed over a series of baffle structures which spread the production out into thin layers in which the break-out travel time of the gas is reduced.

The invention further contemplates the entire production being passed to a second source of heat through a vertical passage in which the relatively high gravity of the water content of the production tends to suppress foaming tendencies of the oil. The emulsion and oil passed over the second source of heat brings it up to an optimum temperature for coalescence while removing gas evolved through a separate passage.

The invention further contemplates that water passed down the vertical passage to the second source of heat will be removed to a heat exchanger to transfer its heat into the stream of production going to the first heat source in order to conserve such heat.

Figure 2:
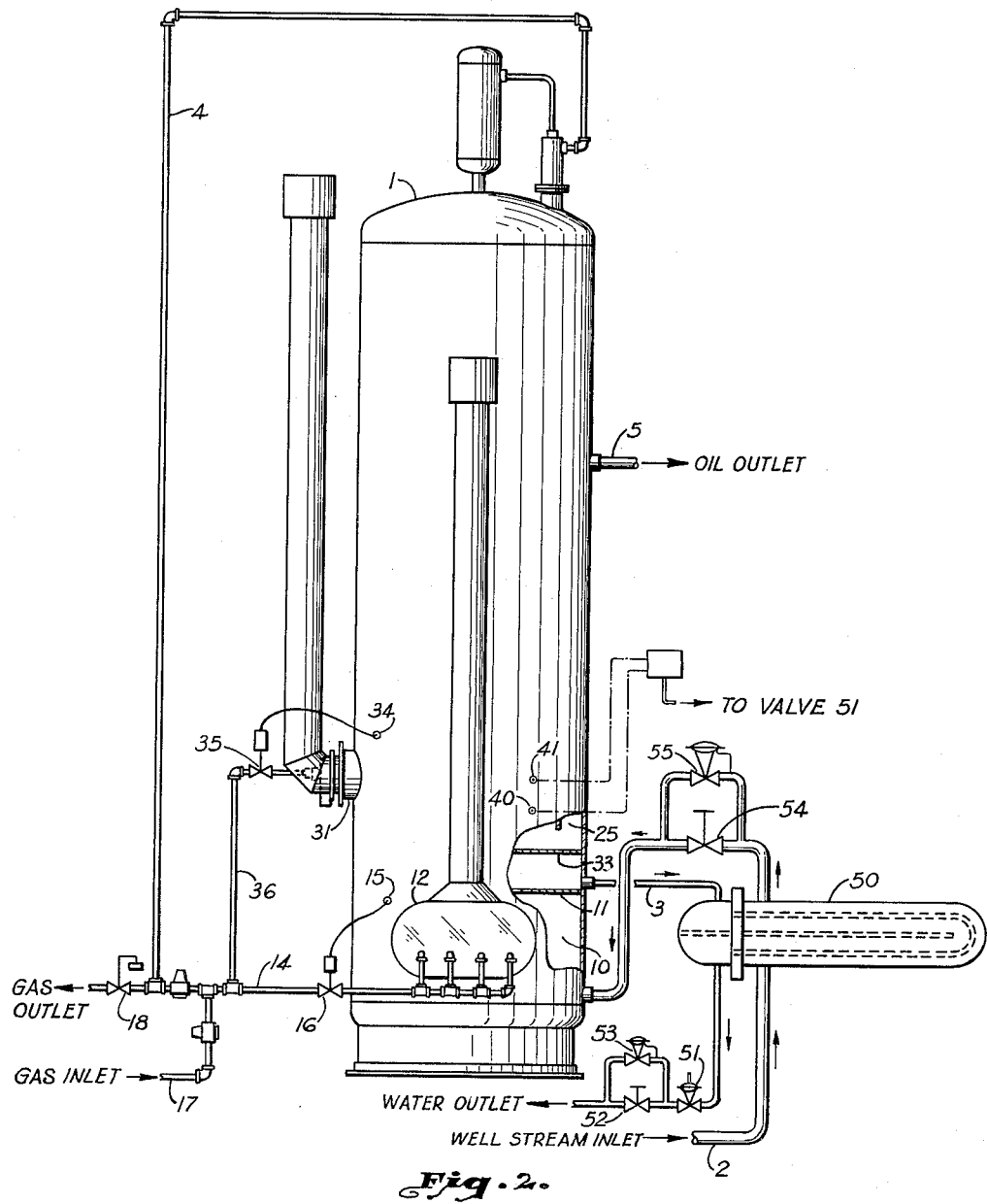

Other objects, advantages and features of this invention will become more apparent to one skilled in the art upon consideration of the written specification, appended claims, and the attached drawings wherein:

FIG. 1 is a sectioned, diagrammatic, front elevation of a treating vessel embodying features of the present invention; and FIG. 2 is a sectioned, diagrammatic, front elevation of the vessel of FIG. 1 in combination with a heat exchanger.

FIG. 1 is used to illustrate in somewhat diagrammatic form, a vessel in which the treating of oil well production is carried out in accordance with the present invention. Treater shell 1 is shown in a cross sectioned elevation. An inlet conduit 2 is illustrated as bringing the production of an oil well into the shell 1. The water evolved in the treating process is removed through a conduit 3. the gas evolved in the treating process is removed through a conduit 4. Finally, the clean oil produced by the process is removed through a conduit 5.

The emulsion inlet 2 introduces the emulsion into a chamber 10, which chamber is formed in the lower end of shell 1. A horizontal baffle 11 is extended across shell 1 to form chamber 10. Mounted within chamber 10 is a battery of gas-fired heater tubes, each of which is of conventional design, and which is the main source of heat for the process. Heat source 12 is essentially within chamber 10, and the emulsion from inlet 2 is dispersed beneath heat source 12 by a spreader plate 13.

Illustration of how the firetubes of heat source 12 are supplied with gas evolved from the process is represented by having outlet gas conduit 4 connect into a manifold conduit 14 from which the heat sources are individually supplied. A thermometer element 15 is illustrated as controlling a regulator valve 16. Thermometer 15 maintains the firing rate of the heat source 12 at the level necessary to obtain the required temperature of the liquids within chamber 10.

Should the fuel gas supplied manifold 14 from gas conduit 4 be insufficient to maintain the required firing rate, fuel gas from an outside source may be added through a conduit 17. Should there be an excess of evolved gas in conduit 4, it may be relieved from manifold 14 through back pressure valve 18.

The well stream introduced into chamber 10 is expected to have a high percentage of water, in the order of 40 percent of the total volume. A tremendous amount of heat is required of source 12 to provide a raise in temperature to the order of 200 degrees at the exit from chamber 10. All the fluids of the well stream pass upwardly over heat source 12 and upwardly through a large flume 20, extending down through baffle-partition 11.

Flume 20 removes all of the heated liquids to the top of shell 1. As the well stream has such a high percentage of water content, chamber 10, and the flume 20, will be substantially full of water. The oil and emulsion will be dispersed up through this water, and washed by it, as it ascends to the top of shell 1.

In the top of shell 1 is a chamber provided with the structure for thinning the oil out and scrubbing it to eliminate the gas and break up any foam remaining in the oil. This separator may be considered as occupying the entire top portion of shell 1 above transverse baffle 21. Flume 20 extends through baffle 21 in order to deliver the heated well stream into the separator chamber. A vertical baffle 22 extends upwardly from horizontal baffle 21 to form an enlarged extension of flume 20 in which the liquids collect and from which the liquids discharge to spread over a second horizontal baffle 23. The liquids spread out on baffle 23 flow to the other side of the shell 1 and precipitate downwardly on a second horizontal baffle 24 to again spread out and shorten the travel for gas in breaking out of the liquid. From baffle 24 the liquids precipitate downwardly on horizontal baffle 21 and flow downwardly through a flume 25.

In the top of the separator section above baffle 21 is mounted a conventional mist extractor 26 through which the gas separated from the liquids is removed. The mechanical action of spreading, and respreading, the liquids of the well stream over the various trays or baffles, of the separator constitute a continuous mechanical manipulation of the liquids which shorten the travel distance for the gas to break out of the liquids. The foam which has not been reduced by the washing with the heated water in chamber 10 and flume 20 is eliminated by this mechanical manipulation. The liquids delivered to the top of flume 25 are substantially degassed and prepared for the final phase of the treating process.

The liquids in flume 25 are carried down toward the bottom of shell 1. A second source of heat is provided in a chamber directly above chamber 10. The liquids of flume 25 are carried down into this chamber and the oil and emulsion allowed to flow upwardly over the second heat source.

The chamber directly above chamber 10 may be defined between horizontal baffle 30 and horizontal baffle 11. Heat source 31 is mounted within this chamber and directly above a spreader 32 which receives the liquids of flume 25. A transverse horizontal plate 33 is provided directly below flume 25 to divert the liquids of flume 25 transverse shell 1 and under spreader 32. The water developed in the liquids gravitates downwardly and is drawn out through conduit 3. The lighter oil and emulsion rises over heat source 31 and up into the settling, or coalescing, section of the treater.

Heat source 31 is a firetube having a capacity smaller than that of heat source 12. The heat introduced into the liquids of the well stream is detected by a thermometer element 34 which controls gas valve 35 in conduit 36. Conduit 36 is connected to manifold conduit 14 in order to receive gas from the same source which also supplies heat source 12.

The oil and emulsion rising over heat source 31 is brought to a temperature slightly lower than that produced at thermometer 15. It is desired to evolve very little gas in raising the temperature of the liquids to a value at which their coalescence will take place efficiently. Some gas will be evolved and a conduit 37 is provided to communicate with baffle 30 to provide a path for these gases, isolated from the coalescing section. The gases traveling up conduit 37 are taken into the top of the shell 1 to join the other gases flowing to conduit 4, out of extractor 26.

The oil and emulsion heated by source 31 passes from beneath baffle 30 and up into coalescing section 38. Clean oil is collected in a body above section 38 and is drawn off through conduit 5 as the product of the process. Conduit 5 is connected into a small housing above baffle 21. What few vapors are evolved in this housing above baffle 21 are drawn off through conduit 39 to join the gases of extractor 26, finally withdrawn through conduit 4.

In control of the water level in the chamber above baffle 11, capacitance probes 40 and 41 are provided to detect the difference between oil and water. Probes 40 and 41 are connected into a control mechanism not illustrated which develops power with which to position a valve in conduit 3. Control of the withdrawal of water in conduit 3, in this manner, maintains the level of water at a desired height.

The function of the treater has been covered to some degree while the description of this structure was made. A review, on a purely functional basis, will be helpful to an understanding to the scope of the invention. Experience in treating oil, generally regarded as difficult to treat, has developed very important steps which must be taken in order to accomplish good treating of this type of production. The correct type, amount and degree of mixing of chemical with the well stream before it enters the treater is important. However, the problems associated with obtaining these conditions are not dealt with in disclosing the present invention. The well stream enters the treater through conduit 2 where the application of heat, and the use of mechanical manipulation, produces oil of merchantable quality at outlet conduit 5.

Heating of the well stream lowers the viscosity of black asphaltic, low gravity, high viscosity crude production. With the viscosity lowered, better chemical mixing occurs to produce faster chemical action. However, when heat is introduced into these types of production, foaming of the oil is likely to occur. The present treater and process provides means for heating the entire stream in order that the high percentage of water can be utilized as a bath with which to wash, and reduce, the foam. This washing occurs in chamber 10 and flume 20.

The entire well stream is then mechanically spread, and respread, in thin layers to reduce the distance gas must travel through the liquids to break out and separate therefrom. This mechanical manipulation is accomplished in the top of shell 1 by the use of baffles 23, 24 and 21, arranged as disclosed.

All of the liquids are then passed down flume 25 where the relatively heavy water in the production, by its weight, militates against further foam development as the liquids are taken to heat source 31.

Heat source 12 is controlled to bring the oil and emulsion of the production up to a temperature which will bring about a complete break of the emulsion. In the mechanical scrubbing process, and subsequent passage down flume 25, the liquids are reduced in temperature by radiation losses through the wall of shell 1. Heat source 31 against elevates the temperature to a value which will properly prepare the oil and emulsion for the agglomeration in the coalescing section 38. The production is substantially degassed by the time it flows into coalescing section 38. Therefore, the function of the coalescing section 38 in agglomerating the water and oil particles proceeds with maximum efficiency. The new result obtained is a thorough treatment of crude oil well production of the type described to a degree heretofore unobtainable.

Referring to FIG. 2, the shell 1 of the treater is shown with the firetubes 12 and 31 properly oriented as an actual reduction to practice of the invention was constructed. In FIG. 1 the oil outlet conduit 5 and firetube 31 are reoriented from the actual construction to illustrate the flow paths for the well fluids to somewhat better advantage.

A heat exchanger 50 is illustrated in combination with the treater. Exchanger 50 is used to scavenge, or conserve, the heat of source 12 from the water of the well stream. When the large quantities of water in the well stream are considered, the amount of heat inserted by source 12 represents a very significant value. Heat exchanger 50 represents one means whereby this valuable heat may be conserved.

The large quantities of water in the production which is treated within shell 1 are passed from the lower portion of the chamber between partitions 11 and 30 into conduit 3. Conduit 3 is shown passing through the tube side of exchanger 50. A valve 51 is shown in conduit 3. Although the details are not illustrated, it is contemplated that valve 51 will be opened and closed by power impulses generated by probes 40 and 41. Basic control of the rate of water discharge is with the manual setting of valve 52. A by-pass valve 53 is included for safety.

The well stream of conduit 2 is shown connected to the shell side of exchanger 50. Basic control of the rate of production flow to the treater is established by the manual setting of valve 54. A by-pass valve 55 is provided to prevent rupture of the conduit, or heat exchanger, on heading periods of wells supplying conduit 2.

The heat exchanger 50 is illustrated in convenient, simple form. It is appreciated that the specific design of such an exchanger would take the character of liquid mediums into account. The resulting design would, perhaps, be a form radically different from that illustrated. However, basically the heat exchange sought is carried out by the basic principle illustrated with exchanger 50. The result is a raise in temperature of the incoming production of conduit 2 with the conserved heat of water discharged through conduit 3. The firing of heat source 12 can be greatly reduced and a significant savings in fuel effected.

From the foregoing it will be seen that this invention is one well adapted to attain all of the ends and objects hereinabove set forth, together with other advantages which are obvious and which are inherent to the apparatus and method.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of treating oil well production which includes, initially heating oil well production having a high water content and low-gravity, high-viscosity oil with a foaming tendency to within a first range of temperature at which the oil-water emulsion breaks and substantially degasses, passing the heated production upwardly with the production water scrubbing the foam from the oil, spreading the heated production in a series of horizontal layers to aid additional gas in breaking from the production, passing the degassed production downwardly, reheating the oil and emulsion of the production to a second temperature range at which coalescence of the oil and water will take place efficiently and relatively little gas will evolve, maintaining the level of water developed from the production below the point at which the reheating to the second temperature takes place, passing the oil and emulsion heated to the second temperature range upwardly which coalesces the oil and water of the production, removing the coalesced clean oil, and removing water developed from the production.

2. An oil well emulsion treater, including, a cylindrical vessel with its axis vertically oriented, a first heat source mounted in the lower portion of the treater, means for passing an oil well production having a high water content and low-gravity and high-viscosity oil with a foaming tendency over the first heat source to bring the temperature of the production within a first range at which the oil-water emulsion breaks and substantially degasses, a first vertical passage in the vessel in which the initially heated production is passed upwardly with the production water scrubbing the foam from the oil, a baffle section at the top of the passage receiving the production from the vertical passage and spreading the production in layers to additionally degas the production, a second vertical passage in the vessel in which the degassed production is passed downwardly, a second source of heat mounted in the lower portion of the vessel and arranged to heat the production from the second vertical passage to within a second range of temperature at which coalescense of the oil and water will take place efficiently while evolving relatively little gas, means for detecting the level of water developed from the production at the second source of heat and maintaining the level below the second source of heat, a coalescing section above the second source of heat arranged to receive the heated production, means for removing the coalesced clean oil, and means for removing the water developed from the production.

3. A method of treating oil well production which includes, initially heating oil well production having a high water content and low-gravity high-viscosity oil with a foaming tendency to within a first range of temperature at which the oil-water emulsion breaks and substantially degasses, passing the heated production upwardly with the production water scrubbing the foam from the oil, spreading the heated production in a series of horizontal layers to aid additional gas in breaking from the production, passing the degassed production downwardly, reheating the oil and emulsion of the production to a second temperature range at which coalescense of the oil and water will take place efficiently and relatively little gas will evolve, isolating the gas which does evolve in reheating the oil and emulsion of the production to the second temperature range and removing the gas upwardly joining with gas broken from the production when the heated production is spread in the series of horizontal layers, maintaining the level of water developed from the production below the point at which the reheating to the second temperature takes place, passing the oil and emulsion heated to the second temperature range upwardly which coalesces the oil and water of the production, removing the coalesced clean oil, and removing water developed from the production.

4. An oil well emulsion treater, including, a shell elongated along a vertical axis, a first chamber formed in the lower end of the shell, a first heat source mounted in the first chamber, a conduit connected to the first chamber for flowing a well stream into the first chamber and over the first heat source, whereby the well stream having a high water content and a low-gravity and high-viscosity oil is heated to a temperature at which the oil-water emulsion breaks and is substantially degassed, a first vertical passage connected to the top of the first chamber for conducting the heated well stream to the top of the shell, a second chamber formed in the upper end of the shell and connected to the first vertical passage, a series of baffles in the second chamber on which the heated well stream is discharged from the second chamber to spread in layers, a second vertical passage connected to the second chamber for removing the well stream from the second chamber, a third chamber above the first chamber connected to the second vertical passage, a second heat source mounted in the third chamber, means for flowing the well stream from the second vertical passage into the third chamber and flowing the oil and emulsion of the well stream up and over the second heat source to raise the emulsion to a temperature at which coalescence takes place efficiently, a coalescence chamber above the third chamber for receiving the oil and emulsion from the third chamber and collecting the clean oil in a body for removal from the shell, a third vertical passage connected to the third chamber for collecting any gas evolved by the second heating and maintaining the gas in isolation and passing the isolated gas upward to the second chamber, means for removing the coalesced clean oil from the body collected, and means for removing the water developed from the production.

5. A method of treating oil well production which includes, initially heating oil well production having a high water content and low-gravity, high-viscosity oil with a foaming tendency to within a first range of temperature at which the oil-water emulsion breaks and substantially degasses, passing the heated production upwardly with the production water scrubbing the foam from the oil, spreading the heated production in a series of horizontal layers to aid additional gas in breaking from the production, passing the degassed production downwardly, reheating the oil and emulsion of the production to a second temperature range at which coalescence of the oil and water will take place efficiently and relatively little gas will evolve, isolating the gas which does evolve in reheating the oil and emulsion of the production to the second temperature range and removing the gas upwardly joining with gas broken from the production when the heated production is spread in the series of horizontal layers, maintaining the level of water developed from the production below the point at which the reheating to the second temperature takes place, passing the oil and emulsion heated to the second temperature range upwardly which coalesces the oil and water of the production, removing the coalesced clean oil, removing the water developed from the production, and heat exchanging the water developed from the production with production flowing into the process.

6. An oil well emulsion treater, including, a shell elongated along a vertical axis, a first chamber formed in the lower end of the shell, a first heat source mounted in the first chamber, a conduit connected to the first chamber for flowing a well stream into the first chamber and over the first heat source, whereby the well stream having a high water content and a low-gravity and high-viscosity oil is heated to a temperature at which the oil-water emulsion breaks and is substantially degassed, a first vertical passage connected to the top of the first chamber for conducting the heated well stream to the top of the shell, a second chamber formed in the upper end of the shell and connected to the first vertical passage, a series of baffles in the second chamber on which the heated well stream is discharged from the second chamber to spread in layers, a second vertical passage connected to the second chamber for removing the well stream from the second chamber, a third chamber above the first chamber connected to the second vertical passage, a second heat source mounted in the third chamber, means for flowing the well stream from the second vertical passage into the third chamber and flowing the oil and emulsion of the well stream up and over the second heat source to raise the emulsion to a temperature at which coalescence takes place efficiently, a coalescence chamber above the third chamber for receiving the oil and emulsion from the third chamber and collecting the clean oil in a body for removal from the shell, a third vertical passage connected to the third chamber for collecting any gas evolved by the second heating and maintaining the gas in isolation and passing the isolated gas upward to the second chamber, means for removing the coalesced clean oil from the body collected, a conduit for removing the water developed from the production, and a heat exchanger connected to the water conduit and the conduit connected to the first chamber for flowing the well stream into the first chamber, whereby heat is transferred from the third chamber water to the well stream as the stream flows into the first chamber.

7. An oil well emulsion treater, including, a shell elongated along a vertical axis, a first chamber formed in the lower end of the shell, a first heat source mounted in the first chamber, a conduit connected to the first chamber for flowing a well stream into the first chamber and over the first heat source, whereby the well stream having a high water content and a low-gravity and high-viscosity oil is heated to a temperature at which the oil-water emulsion breaks and is substantially degassed, a first vertical passage connected to the top of the first chamber for conducting the heated well stream to the top of the shell, a second chamber formed in the upper end of the shell and connected to the first vertical passage, a series of baffles in the second chamber on which the heated well stream is discharged from the second chamber to spread in layers, a second vertical passage connected to the second chamber for removing the well stream from the second chamber, a third chamber above the first chamber connected to the second vertical passage, a second heat source mounted in the third chamber, means for flowing the well stream from the second vertical passage into the third chamber and flowing the oil and emulsion of the well stream up and over the second heat source to raise the emulsion to a temperature at which coalescence takes place efficiently, a coalescence chamber above the third chamber for receiving the oil and emulsion from the third chamber and collecting the clean oil in a body for removal from the shell, a third vertical passage connected to the third chamber for collecting any gas evolved by the second heating and maintaining the gas in isolation and passing the isolated gas upward to the second chamber, means for removing the coalesced clean oil from the body collected, a conduit for removing the water developed from the production, a heat exchanger connected to the water conduit and the conduit connected to the first chamber for flowing the well stream into the first chamber, whereby heat is transferred from the third chamber water to the well stream as the stream flows into the first chamber, a manually controlled valve in the conduit connected to the first chamber with which the rate of production flow to the treater is basically controlled, and a by-pass valve is arranged in a by-pass conduit around the manually controlled valve to prevent rupture of the conduit connected to the first chamber and the heat exchanger on heading periods of wells supplying the conduit and heat exchanger.

References Cited in the file of this patent
UNITED STATES PATENTS 2,598,988    Glasgow _____ June 3, 1952